3,393,165
POLYMER COMPOSITIONS
Arthur Wallace Evans, Nunthorpe, Middlesbrough, Gerhard Emil Ferdinand Lederer, Hartburn, Stockton-on-Tees, and Thom Ian Kyle, Acklam, Middlesbrough, England, assignors to British Titan Products Company Limited, Durham, England, a company of the United Kingdom
No Drawing. Filed Aug. 2, 1963, Ser. No. 299,469
Claims priority, application Great Britain, Aug. 21, 1962, 32,057/62
22 Claims. (Cl. 260—22)

The present invention relates to a process for the production of pigmented polymeric compositions.

In pigmented polymeric compositions, for example liquid coating compositions of the type known as latex paints, which are emulsion paints containing polymerized monomer or comonomers together with other paint ingredients, the pigmented particles are incorporated into the composition by being stirred with an emulsion of the polymerized monomer forming the base of the paint. In compositions produced in this manner, the pigment particles tend to be poorly dispersed and to remain outside the polymer particles in the dry paint film. This is particularly so in the dry paint film even though the paint, before application, may appear to contain well dispersed pigment.

The properties of the polymeric pigmented compositions would be greatly improved if the pigment particles could be dispersed within the polymer particles, rather than remain outside these.

In the case of latex paints, for example, the dispersion of an increased proportion of the pigment particles within the polymer might lead to improvement in the stability of the paint during storage, in the durability, the gloss, the opacity and in the scrub resistance of the paint film when applied.

It is an object of the present invention to provide a process for the production of pigmented polymeric compositions wherein at least the greater proportion of the pigmented particles are dispersed within the polymer.

Accordingly, the present invention is a process which comprises mixing pigment, water, surface active agent, and polymerizable monomer, thereby causing the transfer of pigment from the water to the monomer, and thereafter polymerizing the resulting pigment-containing monomer. The monomer may be a mixture of copolymerizable monomers.

In the mixing, it is normally desirable first to form a well-dispersed suspension of the pigment in the water, and then to incorporate the polymerizable monomer and the surface active agent.

It is desirable to avoid the presence in the initial mixture of other ingredients which may prevent or hinder the transfer of the pigment to the monomer. Certain materials such as protective colloids have been found to oppose such transfer, and these materials should either be avoided or added after the transfer has been achieved.

The choice of surface active agent and time of addition is important for ensuring that transfer of pigment from the water to the monomer is achieved.

It is preferred to add the surface active agent to the pigment dispersion before the addition of the monomer. It has been found that the surface active agent renders the pigment hydrophobic and thereby favours the transfer of the pigment from the aqueous to the organic phase.

The addition of a dispersion stabilizer to stabilize the dispersion of pigment in monomer, with or subsequent to the addition of the monomer to the mixture, may be advantageous. An example of materials which can be used for this purpose is a pentaerythritol-containing long oil alkyd resin modified with linseed oil. The alkyd resin may be used for this purpose in amounts up to 20% and preferably in amounts in the range 3–10%, by weight of the pigment.

It is preferred that the surface active agent be a cationic surface active agent, e.g., an aliphatic organic amine. Particularly suitable cationic surface active agents are organic acyclic primary amine salts, for example octadecylamine acetate. Secondary, tertiary and quaternary amine salts, for example the octadecyl ester of carboxymethyl trimethyl ammonium chloride, may also be used.

In such surface active agents, one part of the molecule tends to be soluble in organic liquids and the other part of the molecule tends to be soluble in aqueous liquids. It is is preferred that the surface active agent contain a carbon chain of at least 6 and preferably at least 8 carbon atoms in that portion of the molecule which tends to be soluble in organic liquids.

It is desirable that the surface active agent should have good dispersion properties for the pigment in the monomer after the transfer of the pigment from the aqueous phase.

The surface active agent may suitably be used in an amount of 0.1% to 10%, by weight of the pigment. A preferred amount is 1% to 5%, particularly 1% to 3%.

It is preferred to separate the aqueous phase from the pigment-containing monomer before the latter is polymerized, since this assists in the removal of impurities, such as salts, which may be present. However, since in the production of liquid coating compositions, such as latex paints, the polymerization will generally be carried out in an aqueous suspension, it may be unnecessary to separate the aqueous phase. All that may then be required may be the adjustment of the amount of water and monomer in the mixture until a suitable aqueous emulsion is obtained.

The polymerization is normally carried out in the presence of an emulsifying agent and a protective colloid. If desired a plasticizer may also be incorporated into the mixture. Alternatively, the pigment-containing monomer may be such as to yield a polymer of the internally plasticizer type.

Any finely-divided pigment may be used in the process of the present invention as long, of course, as it does not prevent polymerization of the monomer, or otherwise prove incompatible with the other components of the composition. However, the invention is of particular value in the preparation of a dispersion of pigmentary titanium dioxide within a polymer. If titanium dioxide is used, it may be of the anatase or rutile form and may be coated with any coating agent, or it may be uncoated. It is preferred to use a coated pigment, for example, a rutile pigment coated with metal oxide, e.g., aluminum, and/or titanium dioxide; the pigment may also be coated with metalloid oxide, e.g., silica, if desired.

The polymerizable monomer may be any of those normally used in the production of liquid coating compositions. It may, for example, be a vinyl ester of an aliphatic monocarboxylic acid having from 2 to 8 carbon atoms in its molecule, e.g., vinyl acetate; an acrylic or methacrylic ester of an aliphatic monohydric alcohol containing from 1 to about 10 carbon atoms such as methyl, ethyl, propyl or butyl acrylate or methacrylate; acrylonitrile; vinylidene chloride; styrene; butadiene; or a mixture of any of these monomers. If desired, a maleic or fumaric acid diester of a saturated aliphatic monohydric alcohol containing from 1 to about 10 carbon atoms may be substituted for styrene or butadiene to produce a copolymer.

Where a latex paint is to be formed, the polymerization is generally carried out in an aqueous emulsion in the presence of other components known to have a beneficial effect upon the paint produced. In addition to water, such other components may include, for example, an emulsifying agent, a protective colloid (for example methyl or ethyl cellulose or hydroxy-substituted methyl or ethyl cellulose), and a plasticizer (if the polymer is not of the internal plasticizing type).

During the polymerization step of the process of this invention, there may be used any polymerization initiator which will bring about polymerization of the monomer under the desired conditions for the formation of the pigment composition. In the preparation of latex paints, it is preferred to carry out the polymerization in the presence of a redox system, for example one containing a salt of persulphuric acid or an organic hydroperoxide or peroxide, and a water-soluble sulphite, bisulphite or hydrosulphite, or addition compounds of these with formaldehyde such as water-soluble metal formaldehyde sulphoxylates. The amount of oxidizing agent used may, for example, be such as to provide from 0.0001 to 1 part of available oxygen per 100 parts of monomer, preferably 0.001 to 0.1 parts of available oxygen. The amount of reducing agent which can be used varies, but will be known to those working in this field. A small amount of a water-soluble iron salt, for example a ferrous salt, may also be added to reduce the induction time before polymerization takes place. A convenient amount of such salt is less than 0.1%, by weight of the monomer.

A sequestering agent may also be added, particularly when a water-soluble iron salt is present. Such sequestering agent may be, for example, a salt of ethylene-diamine-tetraacetic acid, sodium hexametaphosphate, sodium pyrophosphate or sodium silicate. The addition of such sequestering agent may be unnecessary where the surface active agent or emulsifying agent previously added is also effective as a sequestering agent.

The polymerization is preferably initiated by the addition of the oxidizing agent, for example ammonium persulphate, followed immediately by the reducing agent, for example sodium bisulphite (and the ferrous salt if added). It has been observed that the presence of certain components in the mixture to be polymerized, for example an alkyd resin, may tend to slow down the rate of polymization as the polymerization proceeds and it may be advantageous when this happens to add in the later stages of polymerization an oil-soluble, free-radical-forming initiator, for example benzoyl peroxide, to increase the speed of polymerization. The amount of free radical-forming initiator may, for example, be such as to provide from 0.0001 to 1.0 parts of available oxygen per 100 parts of monomer, preferably 0.0001 to 0.05 parts of available oxygen.

The polymerization is preferably carried out at or near room temperature. Generally temperatures above the boiling point of the monomer are to be avoided in the initial stages of the reaction, since such temperatures might cause the more volatile constituents of the reaction mixture to evaporate.

The volume of pigment solids in the polymerized product is suitably adjusted to be in the range of 1% to 75% of the total volume of solids in the product. If the polymerized product is to be used as a liquid coating composition, the range should preferably be 10% to 45%.

The following example shows an embodiment of the present invention.

Example

A polymerization apparatus was set up consisting of a flask fitted with a stirrer, reflux condenser and thermometer. The flask was heated in a water bath.

In a separate vessel, 5 g. of octadecylamine acetate were stirred into 416 g. of a slurry of 250 g. rutile titanium dioxide pigment, coated with alumina and titania, and well dispersed in water. Vinyl acetate (containing 10% of a pentaerythritol-containing long oil alkyd resin modified with linseed oil) was added at a moderate speed with slow stirring. When 125 g. had been added it was noted that the pigment formed a soft plastic mass with the monomer and the water separated into a discrete phase. The stirring was then stopped and the mixture was allowed to stand to allow the phase separation to be completed, after which the aqueous phase was decanted off.

A further 125 g. of vinyl acetate were added to the pigmented organic phase thus produced and this mixture was then added in the flask of the above mentioned polymerization apparatus to 397.8 g. of an aqueous mixture containing 332 g. of water, 60 g. of a 20% by weight solution of hydroxyethylcellulose in water as a protective colloid, 5 g. of a polyethylene oxide emulsifying agent, 0.2 g. of the tri-sodium salt of ethylene diamine tetra-acetic acid as a sequestering agent, and 0.6 g. of sodium bicarbonate. The mixture was stirred during the addition and stirred briskly for 10 minutes thereafter to cause emulsification, the temperature of the mixture being adjusted so that the internal and external temperature (in the water bath) was 50° C.

The polymerization was initiated by the addition of 1.9 g. of ammonium persulphate dissolved in 5 g. of water, followed immediately by 5 g. of sodium metabisulphite dissolved in a further 5 g. of water. The water bath temperature was raised at a rate of 2° C. every 15 minutes and when the temperature of the mixture reached 68° C., a solution was added of 0.2 g. of benzoyl peroxide in 10 g. of vinyl acetate. Heating was continued until the temperature of the mixture reached 90° C. 25 g. of dibutyl phthalate were added as plasticiser. The temperature was kept at 90° C. for 15 minutes to complete the polymerization. The temperature was then reduced to 30° C.

Microscopic examination of the product showed that the pigment was well dispersed and completely in the polymer phase. The product gave a paint of excellent stability during storage and of excellent surface finish and opacity when applied to a surface.

This paint was in these respects superior to a paint produced by the prior art process in which the pigment was incorporated in the paint by mixing the pigment with emulsified polymer; or in which the monomer was polymerised in the presence or any or all constituents of the latex paint, the pigment being in the aqueous phase when polymerisation commenced. Microscopic examination of the latter paints showed that the greater part of the pigment remained on the surface of, or between, the polymer particles.

Paint prepared according to the present invention as described above was tested for "scrub resistance" by the method given below. A paint containing the same ingredients prepared by first polymerizing the monomer and then incorporating titanium dioxide pigment into the emulsified polymer thus produced was also tested for this property under similar conditions.

Tin plated panels were coated with the paints by means of a doctor blade to give a dry film thickness of 50 to 55 microns. The films were dried at room temperature for seven days.

A weighted nail brush having ½ inch bristles was mechanically propelled over the surface of the paint films at a rate of about 2,200 passes per hour. The number of passes made until breakdown of the paint film occurred was recorded in each case and is given below:

No. of passes
Paint prepared from polymerization of pigmented
    polymer _____ 4,000
Paint from pigmentation of emulsified polymer __ 390

We claim:
1. A process for the preparation of a pigmented polymeric composition which comprises the steps of:
   (a) preparing, by mixing, an intimate mixture consisting essentially of:
      (1) pigment,
      (2) water,
      (3) a surface active agent for the pigment which renders the pigment more hydrophobic, one portion of the surface active agent molecule characterized as soluble in aqueous liquids and the remaining portion of the surface active agent molecule comprising a carbon chain and characterized as soluble in organic liquids, and
      (4) normally liquid organic monomer containing at least one ethylenic unsaturation per monomer molecule;
   (b) maintaining mixture components (1) through (4) in said intimate mixture until substantially all of said pigment is transferred to the organic monomer phase;
   (c) separating substantially pigment-free aqueous phase and said pigment-containing organic monomer phase; and
   (d) thereafter polymerizing said pigment-containing monomer.

2. A process in accordance with claim 1 in which said surface active agent is a cationic surface active agent.

3. A process in accordance with claim 2 in which said surface active agent is selected from the group consisting of organic acylic amines and primary, secondary, tertiary and quaternary amine salts.

4. A process in accordance with claim 1 in which the amount of surface active agent is 0.1 to 10% by weight of the pigment.

5. A process in accordance with claim 1 in which the amount of surface active agent is 1 to 5% by weight of the pigment.

6. A process in accordance with claim 1 wherein said pigment is titanium dioxide.

7. A process in accordance with claim 1 in which said pigment (1) and said water (2) are premixed to form a well dispersed suspension of pigment in water prior to their introduction into the mixture of step (a).

8. A process in accordance with claim 7 in which surface active agent (3) is admixed with said aqeous pigment dispersion prior to the addition of said monomer (4).

9. A process in accordance with claim 8 in which the surface atcive agent is a cationic surface active agent.

10. A process in accordance with claim 9 in which the surface active agent is selected from the group consisting of organic acyclic amines and primary, secondary, tertiary and quaternary amine salts.

11. A process in accordance with claim 9 in which the surface active agent is a cationic surface active agent containing an alkyl chain of at least six carbon atoms.

12. A process in accordance with claim 8 in which the pigment is titanium dioxide.

13. A process in accordance with claim 7 in which an effective amount up to 20% by weight of the pigment of a dispersion stabilizer is added to said suspension at a stage no earlier than that at which monomer (4) is added to said suspension.

14. A process in accordance with claim 13 in which the dispersion stabilizer is a pentaerythritol-containing long oil alkyd resin modified with linseed oil.

15. A process according to claim 14 in which the amount of said modified alkyd resin is 3 to 10% by weight of the pigment.

16. A process in accordance with claim 13 in which said pigment is titanium dioxide and in which the amount of surface active agent is 0.1 to 10% by weight of the titanium dioxide pigment.

17. A process in accordance with claim 16 in which the amount of surface active agent is 1 to 5% by weight of the pigment.

18. A process for the preparation of a pigmented polymeric composition which comprises the steps of:
   (a) dispersing pigment in water to form a well-dispersed suspension;
   (b) adding to said suspension from 0.1 to 10% by weight of the pigment of a cationic surface active agent for the pigment which renders the pigment more hydrophobic, one portion of the surface active agent molecule characterized as soluble in aqueous liquids and the remaining portion of the surface active agent molecule comprising a carbon chain and characterized as soluble in organic liquids;
   (c) adding a normally liquid organic monomer containing at least one ethylenic unsaturation per monomer molecule to the suspension of step (b);
   (d) adding 3 to 10% by weight of the pigment of a pentaerythritol-containing long oil alkyd resin modified with linseed oil as a dispersion stabilizer to the suspension at a stage not earlier than that at which the monomer is added to said suspension;
   (e) intimately mixing said suspension from steps (a) through (d) to provide a mixture consisting essentially all of said pigment is transferred to and carmonomer, and modified alkyd resin whereby substantially all of said pigment is transferred to and carried by said monomer; and
   (f) thereafter polymerizing said pigment-containing monomer.

19. A process in accordance with claim 18 in which said pigment is selected from the group consisting of titanium dioxide and titanium dioxide coated with at least one member of the group consisting of alumina, titanium dioxide and silica.

20. A process in accordance with claim 18 in which water is separated from the pigment-containing monomer of step (d) prior to the polymerization step (f).

21. A process in accordance with claim 10 in which said separated pigment-containing monomer is mixed with fresh water and emulsified therein prior to said polymerization step (f).

21. A process in accordance with claim 20 in which protective colloid is added to the polymerization system subsequent to step (e) and the polymerization of pigment-containing monomer of step (f) is conducted in the effective presence of said protective colloid.

References Cited
UNITED STATES PATENTS

| | | | |
|---|---|---|---|
| 3,023,177 | 2/1962 | Boucher | 260—29.6 |
| 2,067,234 | 1/1937 | Gordon et al. | 260—23 |
| 2,161,481 | 6/1939 | Marks | 260—29.6 |
| 2,825,708 | 3/1958 | Auer | 260—29.6 |
| 2,868,757 | 1/1959 | Symons | 260—29.6 |
| 2,992,197 | 7/1961 | Boller | 260—23 |
| 3,002,942 | 10/1961 | Zoetbrood | 260—22 |
| 3,054,762 | 9/1962 | Rees | 260—29.6 |
| 3,244,657 | 4/1966 | Grosser et al. | 260—23 |

FOREIGN PATENTS

| | |
|---|---|
| 138,219 | Australia. |
| 899,413 | Great Britain. |

DONALD E. CZAJA, Primary Examiner.
L. J. BERCOVITZ, Examiner.
R. W. GRIFFIN, Assistant Examiner.